United States Patent
Swartz et al.

(10) Patent No.: US 10,979,378 B1
(45) Date of Patent: Apr. 13, 2021

(54) SYSTEM AND METHOD FOR PROMOTING USER ENGAGEMENT

(71) Applicant: Capital One Services, LLC, McLean, VA (US)

(72) Inventors: Ryan Swartz, Plymouth Meeting, PA (US); Damian Von Schoenborn, St. Paul, MN (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/023,638

(22) Filed: Sep. 17, 2020

(51) Int. Cl.
*H04L 12/58* (2006.01)

(52) U.S. Cl.
CPC ............ *H04L 51/24* (2013.01); *H04L 51/043* (2013.01); *H04L 51/22* (2013.01)

(58) Field of Classification Search
None
See application file for complete search history.

(56) References Cited

U.S. PATENT DOCUMENTS

| | | | |
|---|---|---|---|
| 5,717,865 A | 2/1998 | Stratmann | |
| 5,805,810 A * | 9/1998 | Maxwell | G06Q 10/107 709/200 |
| 6,772,129 B2 * | 8/2004 | Alvarez | G06Q 30/02 705/14.41 |
| 6,839,681 B1 | 1/2005 | Hotz | |
| 7,653,568 B2 | 1/2010 | Keller et al. | |
| 7,966,226 B1 | 6/2011 | Temares et al. | |
| 9,301,022 B1 * | 3/2016 | Rowles | H04N 21/41407 |
| 9,922,315 B2 * | 3/2018 | Feldschuh | G06Q 50/12 |
| 10,556,254 B1 * | 2/2020 | Delfer | H04L 51/18 |
| 2002/0026360 A1 * | 2/2002 | McGregor | G06Q 30/0269 705/14.66 |
| 2002/0111847 A1 * | 8/2002 | Smith, II | G06Q 30/0201 705/7.31 |
| 2003/0074411 A1 * | 4/2003 | Nale | H04L 51/28 709/206 |
| 2003/0093308 A1 * | 5/2003 | Kiefer | G06Q 30/0205 705/14.42 |
| 2003/0105704 A1 * | 6/2003 | Sundel | G06Q 10/0833 705/37 |
| 2003/0158776 A1 * | 8/2003 | Landesmann | G06Q 30/0218 705/14.25 |

(Continued)

*Primary Examiner* — Backhean Tiv
(74) *Attorney, Agent, or Firm* — Hunton Andrews Kurth LLP

(57) ABSTRACT

Systems and methods for promoting user engagement with messaging, such as advertising are presented. Specific marketing communications may be evaluated by measuring user responsiveness, such as the respective times at which advertising and other messages may be sent to a user and at which a user may respond, and using these measurements to determine a relative value of the advertising and other messages based on a time decay analytical approach. This approach may include sending an electronic communication to a user interface at a first time for display, sending an electronic message, such as an e-mail or text message to the user at a second time, sending a physical mailing to the user at a third time, receiving a user response at a fourth time, determining the time that elapsed between the fourth time and each of the first, second and third times, and assigning a relative value to each of these messaging events.

20 Claims, 10 Drawing Sheets

(56) References Cited

U.S. PATENT DOCUMENTS

| | | | |
|---|---|---|---|
| 2004/0220826 A1 | 11/2004 | Hey | |
| 2004/0230477 A1* | 11/2004 | Alvarez | G06Q 30/0242 705/14.41 |
| 2006/0149630 A1* | 7/2006 | Elliott | G06Q 30/0267 705/14.64 |
| 2006/0242247 A1* | 10/2006 | Richardson | G06Q 40/08 709/206 |
| 2007/0116227 A1* | 5/2007 | Vitenson | H04M 3/4878 379/207.02 |
| 2007/0124203 A1 | 5/2007 | Popescu et al. | |
| 2007/0157229 A1* | 7/2007 | Heathcock | G06Q 30/02 725/34 |
| 2007/0179945 A1* | 8/2007 | Marston | G06Q 10/107 |
| 2007/0265919 A1* | 11/2007 | Jarjour | G06Q 30/02 705/14.18 |
| 2007/0300263 A1* | 12/2007 | Barton | H04N 21/4147 725/60 |
| 2010/0192082 A1* | 7/2010 | Sodah | G06Q 30/02 715/771 |
| 2010/0332301 A1* | 12/2010 | Higgins | G06Q 30/0273 705/14.11 |
| 2011/0145043 A1 | 6/2011 | Handel | |
| 2011/0320260 A1* | 12/2011 | Briggs | G06Q 30/0202 705/14.42 |
| 2012/0109738 A1* | 5/2012 | Han | G06Q 30/0242 705/14.41 |
| 2012/0109739 A1* | 5/2012 | Gupta | G06Q 30/0242 705/14.41 |
| 2012/0226690 A1* | 9/2012 | Kheyfets | G06Q 10/04 707/737 |
| 2013/0018719 A1* | 1/2013 | Abraham | G06Q 30/0242 705/14.41 |
| 2013/0254033 A1 | 9/2013 | Krishnamoorthy et al. | |
| 2013/0282476 A1* | 10/2013 | Peterson | G06Q 30/0241 705/14.41 |
| 2013/0325640 A1* | 12/2013 | Morgan | G06Q 30/02 705/15 |
| 2014/0180804 A1 | 6/2014 | Jordan et al. | |
| 2014/0222948 A1* | 8/2014 | Terasawa | G06Q 30/06 709/213 |
| 2016/0180355 A1* | 6/2016 | Amano | G06Q 30/0201 705/7.31 |
| 2017/0161757 A1 | 6/2017 | Zenor et al. | |
| 2017/0200107 A1 | 7/2017 | Stouse et al. | |
| 2017/0262900 A1 | 9/2017 | Ramachandran et al. | |
| 2017/0372347 A1 | 12/2017 | Li et al. | |

* cited by examiner

System 100

Cluster 400

SYSTEM AND METHOD FOR PROMOTING USER ENGAGEMENT

FIELD OF THE DISCLOSURE

The present disclosure relates generally to technology for analyzing marketing and advertising and, more specifically, to an exemplary system and method for promoting user engagement with specific marketing communications.

BACKGROUND

Many businesses and organizations use marketing and advertising techniques to reach consumers, including use of electronic advertisements in broadcast media, in electronic communications such as e-mails and text messages, online ad placements with web sites, mailing of physical materials, etc. An issue in marketing is in assessing the relative value of different advertising materials and marketing techniques to which a consumer may be exposed. Marketing teams desire to accurately attribute sales to those advertising materials and marketing techniques most likely to have led consumers to make purchases.

However, data required to make such assessments is difficult to obtain. Often, marketing teams can only evaluate data regarding consumers who actually purchased the respective advertiser's product or service, resulting in limited options for marketing attribution, typically rules-based solutions.

Thus, it may be beneficial to provide exemplary systems and methods which may more accurately determine user engagement with advertising, to overcome at least some of the deficiencies described herein.

SUMMARY

Aspects of the disclosed technology include systems and methods for promoting user engagement with messaging, such as advertising. Promoting user engagement with messaging may be provided in the context of evaluating specific marketing communications by measuring user responsiveness, such as the respective times at which advertising and other messages may be sent to a user and at which a user may respond, and using these measurements to determine a relative value of the advertising and other messages based on a time decay analytical approach. In this way, a party may determine the effectiveness of particular messages, such as advertising, and the techniques used to present these messages to users. This provides an advantage over current marketing attribution technology, which tends (even when applying a time decay theory) to rely on arbitrary, rules-based approaches or generalized, formulaic approaches.

Embodiments of the present disclosure provide a system for promoting user engagement comprising: a communication interface configured to provide, to a user device via a network, a user interface that displays a communication at a first time; a messaging server configured to send an electronic message to a user wherein the electronic message is sent at a second time; a database containing a name and mailing address associated with the user, wherein a physical mailing is sent to the user's mailing address at a third time; and a central server communicatively connected to the user device, the central server configured to record user information received from the user device at a fourth time, wherein the central server is in data communication with the messaging server and database and configured to transmit the first, second, third, and fourth times to a cluster configured to analyze the first, second, third, and fourth times to determine a relative value of the communication, electronic message, and physical mailing.

Embodiments of the present disclosure provide a method of promoting user engagement comprising: transmitting a communication via a network from a server to a user interface displayed on a user device at a first time; transmitting an electronic message via a network from a messaging server to a user at a second time; retrieving a user's mailing address from a database and enabling a physical mailing to be sent to a user's mailing address at a third time; recording a fourth time at which the user transmits user information from the user device to the server; determining the time elapsed from the first, second, and third time to the fourth time; assigning a relative value to the communication, electronic message, and physical mailing.

Embodiments of the present disclosure provide a distributed system for creating user accounts comprising: a central server in data communication with a user device displaying a user interface, a database containing user information, and a messaging server in data communication with the central server, database and user device; wherein the messaging server is configured to transmit a communication to the user device at a first time and wherein the communication is displayed on the user interface; wherein the messaging server sends an electronic message to a user based on user information stored in the database at a second time; wherein the user information recorded in the database is used to send a physical mailing to the user's mailing address at a third time; wherein the central server is configured to receive user information from the user device when the user creates an account at a fourth time; and wherein the time elapsed between the first, second, or third time and the fourth time is used to establish a relative value of the communication, electronic message, and physical mailing.

Further features of the disclosed design, and the advantages offered thereby, are explained in greater detail hereinafter with reference to specific example embodiments described below and illustrated in the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Exemplary embodiments of the disclosed systems and methods provide for promoting user engagement with messaging, such as advertising, through use of time decay analytical techniques to determine a relative value of the advertising and other messages. Analysis may include measuring the respective times at which advertising and other messages may be sent to a user and at which a user may respond. Benefits of the disclosed technology may include improved ability to determine the effectiveness of particular messages, such as advertising, and the techniques used to present these messages to users.

Figure 1:
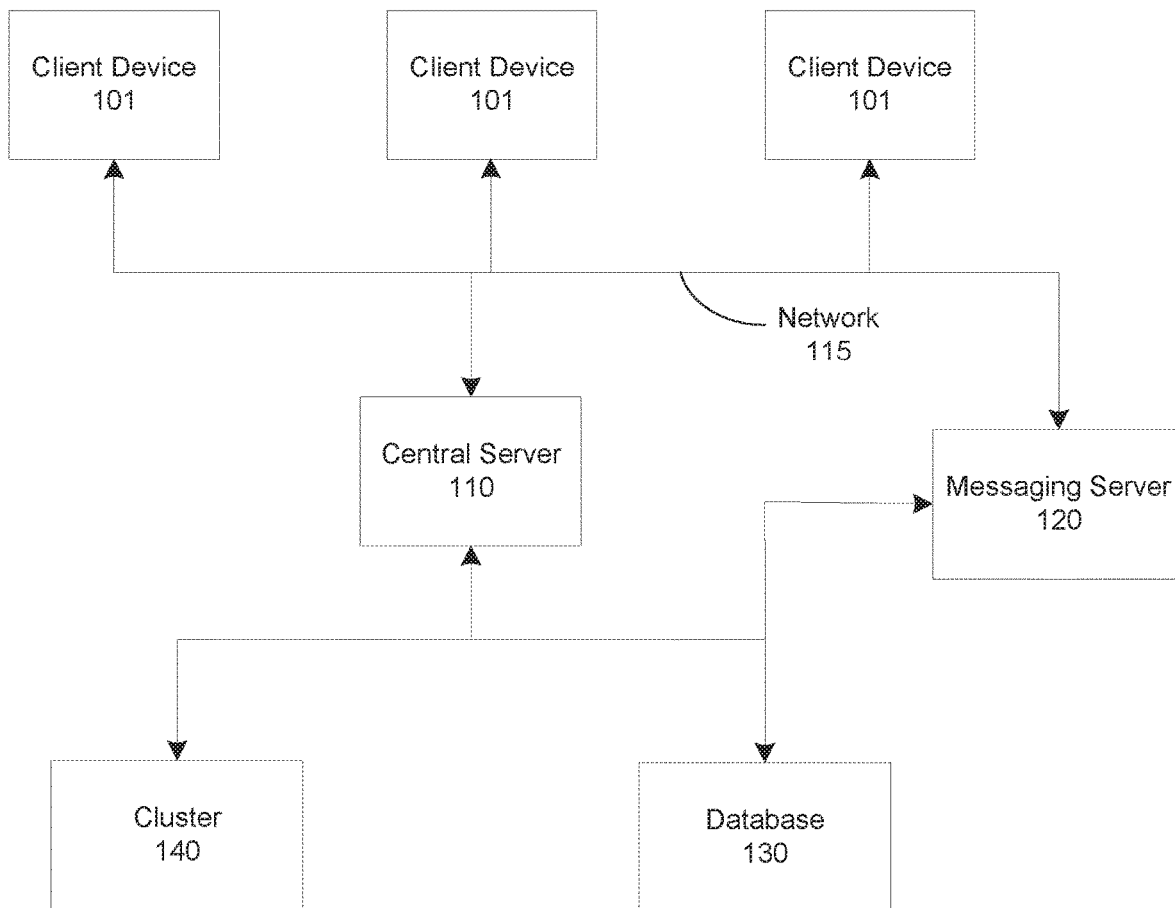
FIG. 1 is a diagram of a system for promoting user engagement according to one or more example embodiments.

FIG. 1 shows a diagram illustrating user engagement system 100 according to one or more example embodiments. As discussed further below, system 100 may include one or more client devices 101, a central server 110, a network 115, a messaging server 120, a database 130 and a cluster 140. User engagement system 100 may also communicate with a backend processing system (not shown) via a network (not shown). Although FIG. 1 illustrates certain components, system 100 may include additional or multiple components connected in various ways. It is understood that not all embodiments include every component shown in FIG. 1. It is also understood that, while FIG. 1 depicts a single instance of many of the component, embodiments may contain multiple instances of any components.

System 100 may include one or more client devices, such as client device 101, which may each be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 101 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In some embodiments, client device 101 may be a point of sale (POS) device and/or associated with a POS system. Additional features that may be included in a client device, such as client device 101, are further described below with reference to FIG. 2.

System 100 may include one or more servers 110. Server 110 may be a central server, e.g., server 110 may be configured as a central system, server or platform to control and call various data at different times to execute a plurality of workflow actions. Server 110 may be a dedicated server computer, such as bladed servers, or may be personal computers, laptop computers, notebook computers, palm top computers, network computers, mobile devices, or any processor-controlled device capable of supporting the system 100.

Server 110 may be configured for data communication (such as, e.g., via a network or other connection) with one or more components of system 100, such as client devices 101, messaging server 120, database 130 and/or cluster 140. Server 110 may also be configured for data communication (such as, e.g., via a network or other connection) with other system components (not shown), such as, e.g. a back-end processor. In some examples, server 110 may be an ad server configured to retrieve an advertisement for display when requested. In other examples, server 110 may be a web server hosting a website. Additional features that may be included in a server, such as central server 110, are further described below with reference to FIG. 3.

Server 110 may be configured to communicate with one or more client devices, such as such as client device 101, and other devices via one or more networks, such as network 115. Network 115 may include one or more of a wireless network, a wired network or any combination of wireless network and wired network, and may be configured to connect client device 101 to server 110. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more example embodiments, network 115 may comprise a plurality of interconnected networks, such as, for example, the Internet, a service provider's network, a cable television network, corporate networks, such as credit card association networks, a LAN, and/or home networks.

System 100 may include one or more messaging servers 120. Messaging server 120 may be a dedicated server computer, such as bladed servers, or may be personal computers, laptop computers, notebook computers, palm top computers, network computers, mobile devices, or any processor-controlled device capable of supporting the messaging features of system 100. Messaging server 120 may be configured for data communication with client devices 101, central server 110, database 130 and/or cluster 140. Messaging server 120 may be configured to send messages, such as advertisements or other marketing messages, to users via client devices 101. Additional features that may be included in a server, such as messaging server 120, are further described below with reference to FIG. 3.

System 100 may include one or more databases 130. Database 130 may be a relational or non-relational database, or a combination of more than one database. In some embodiments, server 110 may incorporate database 130. In some embodiments, database 130 may be physically separate and/or remote from server 110, located in another server, on a cloud-based platform, or in any storage device that is in data communication with server 110. Database 130 may be configured for data communication with central server 110, messaging server 120 and/or cluster 140.

Database 130 may store user information for multiple users. User information may include a user name, mailing address, e-mail address, mobile device number, and information about messages, such as advertisements or other marketing messages, sent (or to be sent) to a user, and the dates/times the messages were sent. Data stored in database 130 may be stored in any suitable format, and may be encrypted and stored in a secure format to prevent unauthorized access. Any suitable algorithm/procedure may be used for data encryption and for authorized decryption.

In some embodiments, central server 110 and/or messaging server 120 may access records, including records in database 130, to determine a method or methods for communicating with a user via client device 101. Messages or requests by client device 101 may be communicated to central server 110 and/or messaging server 120 via an application on the client device, or may be sent by a text message or an e-mail, or other messaging techniques appropriate in a network-based client/server configuration. Communications originating with client device 101 may be sent to central server 110 and/or messaging server 120 using the same communications method as communications originating with central server 110 and/or messaging server 120, or via a different communications method.

System 100 may include a cluster 140. Cluster 140 may include a group of connected computers that work together to perform a common task or set of tasks. Cluster 140 may receive information regarding messaging events, including message, media, time sent, etc. Cluster 140 may analyze the messaging event information and determine a relative value of the messaging sent to a user. Additional features that may be included in a cluster, such as cluster 140, are further described below with reference to FIG. 4.

Connections between central server 110, messaging server 120, database 130 and cluster 140 may be made via any communications line, link or network, or combination thereof, wired and/or wireless, suitable for communicating between these components. Such network may include network 115 and/or one or more networks of same or similar type as those described herein with reference to network 115. In some embodiments, connections between central server 110, messaging server 120, database 130 and cluster 140 may include a corporate LAN.

Communications between components of system 100 may be encrypted or decrypted using any suitable cryptographic method. In some embodiments, central server 110 may encrypt data prior to transmitting data to other devices, using any suitable cryptographic method. Communication between devices may include any methods used for data communication over a network, including, for example, a text message, an e-mail, or other messaging techniques appropriate in a network-based configuration. Communication methods may include an actionable push notification, or other appropriate communication techniques, with an application stored on client device 101. Other communication methods may include a text message or an e-mail, or other messaging techniques appropriate in a network-based client/server configuration.

Exemplary procedures in accordance with the present disclosure can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the client device 101, central server 110, messaging server 120, database 130, and/or cluster 140 or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Figure 2:
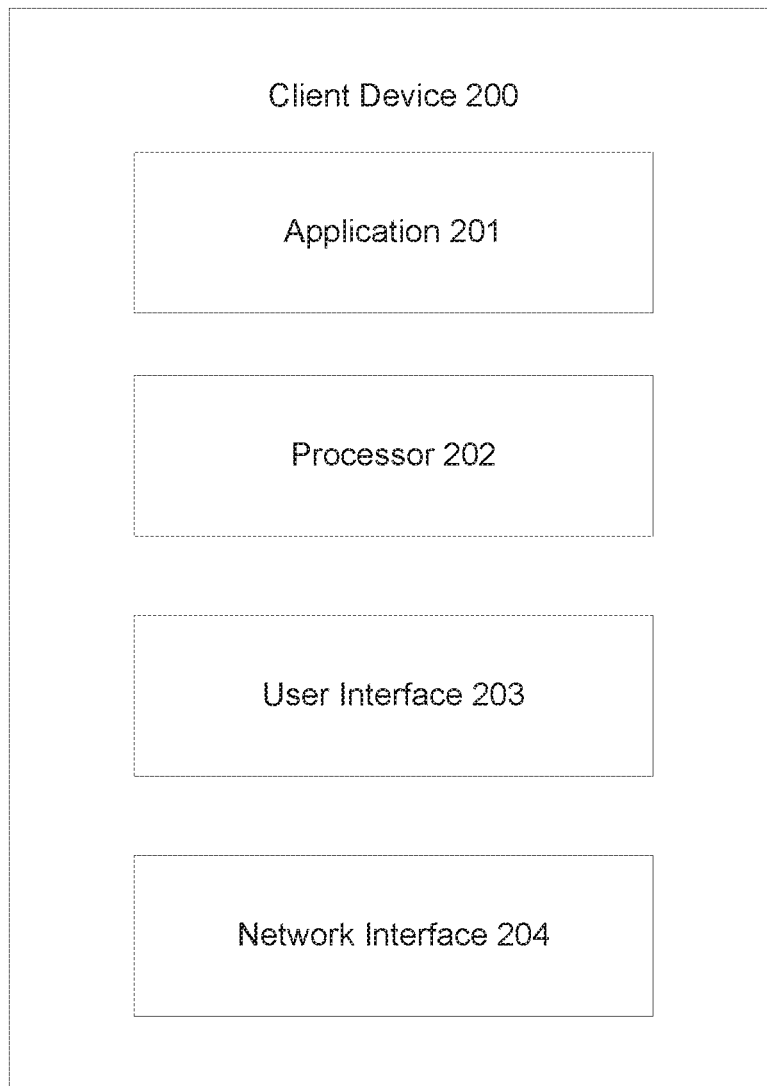
FIG. 2 illustrates components of a client device used in a system for promoting user engagement according to one or more example embodiments.

FIG. 2 illustrates components of a client device 200 used in a system for promoting user engagement according to one or more example embodiments, with reference to components and features described above including but not limited to the figures and associated description. Client device 200 may be one or more of client devices 101, described above with reference to FIG. 1. Client device 200 may include one or more applications 201, one or more processors 202, a user interface 203, and a network interface 204. Client device 200 may also include memory (not shown), which may include a read-only memory, write-once read-multiple memory and/or read/write memory, e.g., RAM, ROM, and/or EEPROM.

Application 201 may include a software application or executable program code to be executed on processor 202 and configured to carry out features described herein for any client devices, such as client device 101. Application 201 may be configured, for example, to transmit and/or receive data with other devices via client device 200, such as, e.g., via network interface 204. For example, application 201 may be configured to initiate one or more requests, and/or to send or receive messages, such as requests or messages involving advertising or other marketing messages. Application 201 may also be configured to provide a user interface 203 via a display (not shown) for a user of the client device. Application 201 may be stored in memory in client device 200.

Processor 202 may include one or more processing devices such as a microprocessor, RISC processor, ASIC, etc., and may include associated processing circuitry. Processor 202 may include, or be connected to, memory storing executable instructions and/or data, as may be necessary or appropriate to control, operate or interface with the other features of client device 200, including application 201 or any other applications running on client device 200. Processor 202 may communicate, send or receive messages, requests, notifications, data, etc. to/from other devices, central server 110 or messaging server 120. Processor 202 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

User interface 203 may present on client device 200 a screen display for presenting messages or information. User interface 203 may include an email client, email reader, mail user agent, instant messaging program, intra-office communication program, text messaging program, web application, or any suitable program for displaying electronic messages or information to a user via client device 200. User interface 203 may be generated by application 201.

Network interface 204 may include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof, including but not limited to network 115. Such network may include, without limitation, telephone lines, fiber optics, IEEE Ethernet 902.3, a wide area network, a local area network, a wireless personal area network, a wide body area network or a global network such as the Internet.

Client device 200 may also include a display (not shown). Such display may be any type of device for presenting visual information such as a computer monitor, a flat panel display, or a mobile device screen, including liquid crystal displays, light-emitting diode displays, plasma panels, and cathode ray tube displays.

Client device 200 may also include one or more device inputs (not shown). Such inputs may include any device for entering information into the client device that is available and supported by the client device 200, such as a touchscreen, keyboard, mouse, cursor-control device, touchscreen, microphone, digital camera, video recorder, or camcorder. The device inputs may be used to enter information and interact with the client device 200 (via application 201 and/or user interface 203) and, by extension, with the systems described herein.

Figure 3:
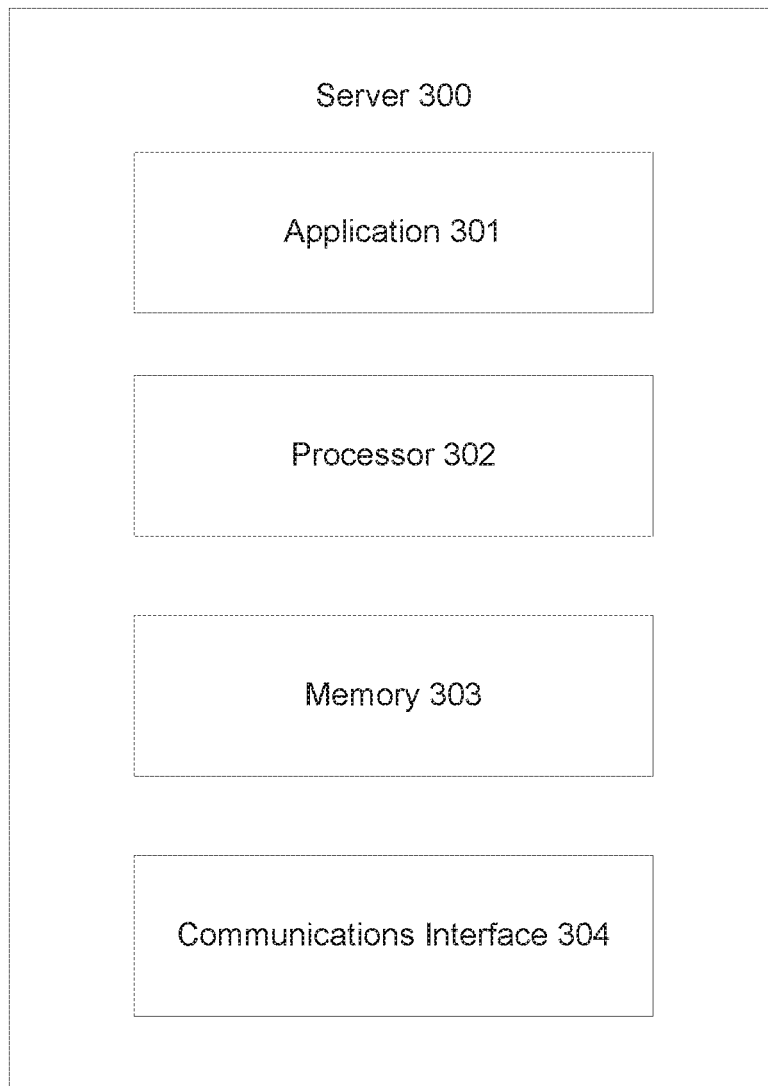
FIG. 3 illustrates components of a server used in a system for promoting user engagement according to one or more example embodiments.

FIG. 3 illustrates components of a server 300 used in a system for promoting user engagement according to one or more example embodiments, with reference to components and features described above including but not limited to the figures and associated description. Central server 110 and/or messaging server 120, described above with reference to FIG. 1, may each be a server 300. Server 300 may include one or more applications 301, one or more processors 302, memory 303, and communications interface 304.

Application 301 may include a software application or executable program code to be executed on processor 302 and configured to carry out features described herein for any servers, such as central server 110 and/or messaging server 120. Application 301 may be configured, for example, to transmit and/or receive data with other devices via server 300, such as, e.g., via communications interface 304. For example, application 301 may be configured to initiate one or more requests, and/or to send or receive messages, such as requests or messages involving advertising or other marketing messages. Application 301 may also be configured to provide a user interface (not shown) that may be transmitted to a client device. Application 301 may be stored in memory 303.

Processor 302 may include one or more processing devices such as a microprocessor, RISC processor, ASIC, etc., and may include associated processing circuitry. Processor 302 may include, or be connected to, memory storing executable instructions and/or data, as may be necessary or appropriate to control, operate or interface with the other features of server 300, including application 301 or any other applications running on server 300. Processor 302 may communicate, send or receive messages, requests, notifications, data, etc. between central server 110 and messaging server 120, or between central server 110 or messaging server 120 and other components of system 100, including client devices 101, database 130 and/or cluster 140. Processor 302 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Memory 303 may include a read-only memory, write-once read-multiple memory and/or read/write memory, e.g., RAM, ROM, and EEPROM, and server 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. Memory 303 may store one or more applications for execution by processor 302, and may also store data used by one or more applications that may be executed by processor 302.

Communications interface 304 may include wired or wireless data communication capability. Communications interface 304 may be configured for data communication between central server 110 and messaging server 120, or between central server 110 or messaging server 120 and other components of system 100, including client devices 101, database 130 and/or cluster 140, and/or between central server 110 or messaging server 120 and other devices, such as, e.g., servers, back-end systems, mobile devices, etc., over a network and protocol common to such devices. These capabilities may support data communication with a wired or wireless communication network, including the Internet, a wide area network (WAN), a local area network (LAN), a wireless personal area network, a wide body area network, a cellular network, a telephone network, any other wired or wireless network for transmitting and receiving a data signal, or any combination thereof (including, e.g., a WiFi network or corporate LAN).

Figure 4:
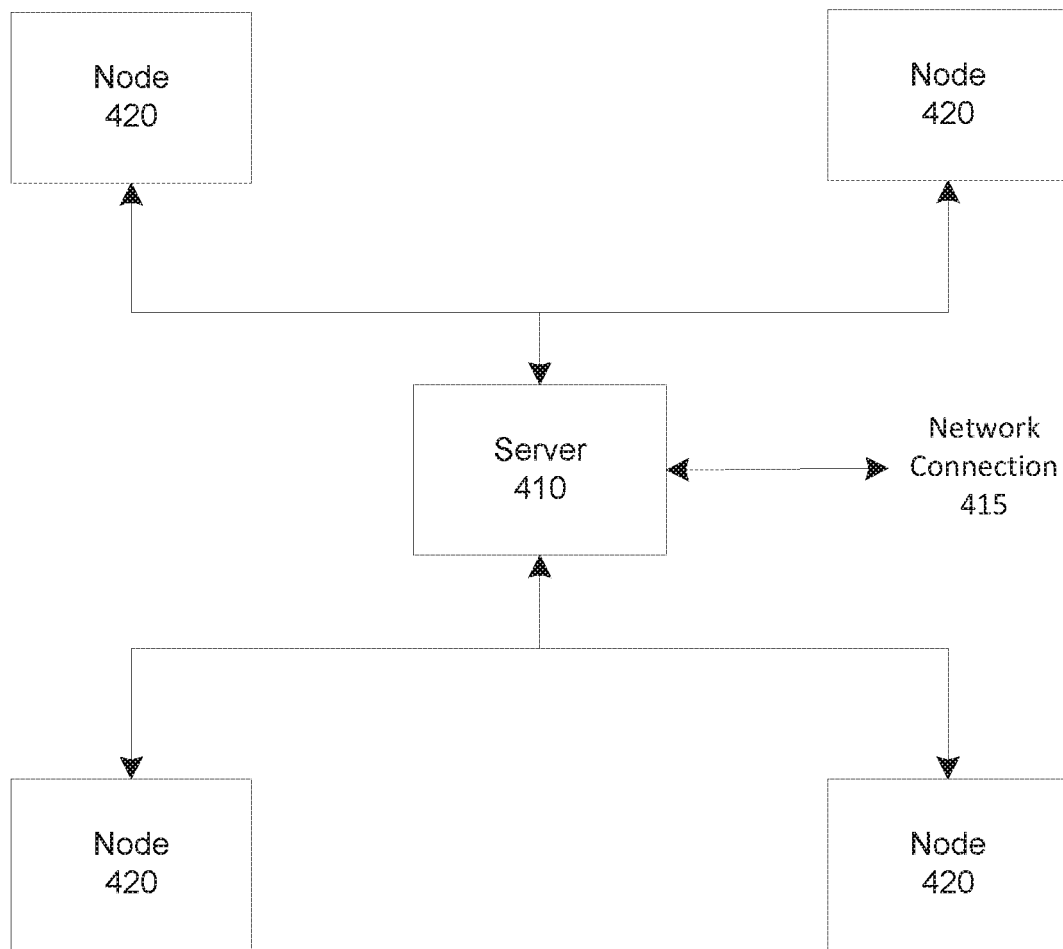
FIG. 4 illustrates components of a cluster used in a system for promoting user engagement according to one or more example embodiments.

FIG. 4 illustrates components of a cluster 400 used in a system for promoting user engagement according to one or more example embodiments, with reference to components and features described above including but not limited to the figures and associated description. Cluster 400 may be cluster 140 described above with reference to FIG. 1.

Cluster 400 may include a server 410. Server 410 may be a server 300 as described above with reference to FIG. 3, and may include some or all of the components of server 300.

Server 410 may include a communications interface, such as communications interface 304 described above with reference to FIG. 3, and may be configured for data communication with other components of cluster 400. Server 410 may also be configured for data communication with devices, such as central server 110, via network 415. Network 415 may be any communications line, link or network, or combination thereof, wired and/or wireless, suitable for data communication between devices, and may include network 115 or any other communications paths as described above with reference to FIG. 1. Server 410 may receive information, coordinate application of analytical techniques to the information, and provide an output.

Cluster 400 may include one or more nodes 420. For purposes of illustration, four nodes are shown in FIG. 4, but a greater or lesser number of nodes may be included in a cluster 400. Each node 420 may be a network-enabled computer and may include a computer device, a server, a network appliance, a personal computer, a workstation, a supercomputer, parallel processor, or other computing device having a processor, and each node 420 may execute one or more applications. Each node 420 may be distributed within a local area or a wide area, and may be configured for data communication with server 410 via any communications line, link or network, or combination thereof, wired and/or wireless, suitable for data communication between devices, including a LAN or WAN. Each node 420 may be configured to work together in a coordinated manner to perform a common task or set of tasks, and may be configured to perform any such tasks under the direction of server 410. Server 410 may coordinate or schedule performance of tasks by each node 420.

Figure 5:
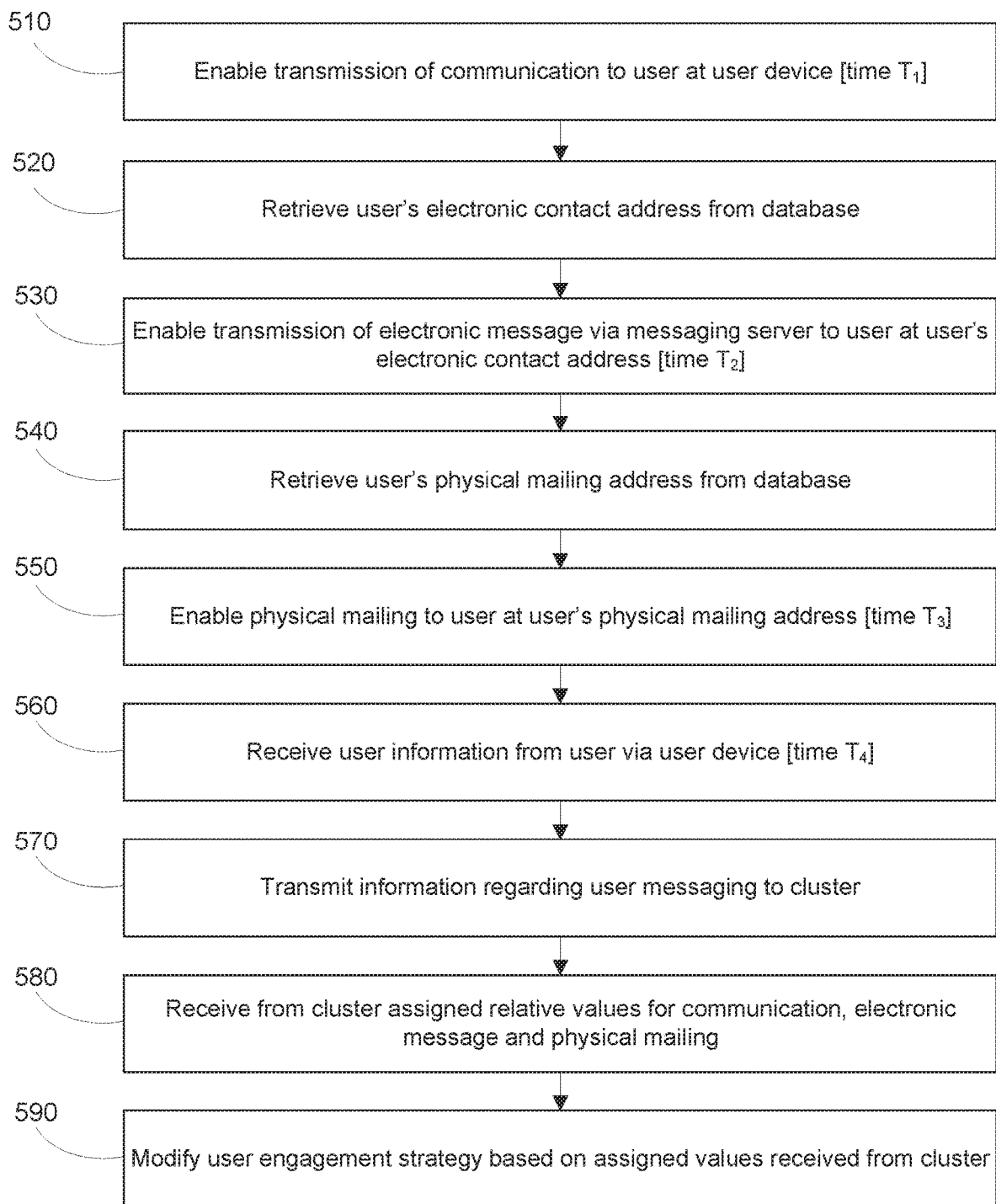
FIG. 5 is a flowchart illustrating a method of promoting user engagement according to one or more example embodiments.

FIG. 5 is a flowchart illustrating a method of promoting user engagement 500 according to one or more example embodiments, with reference to components and features described above including but not limited to the figures and associated description. Method 500 may be carried out by components of system 100, such as central server 110 (including, e.g., via application 301 executing in conjunction with processor 302 as described above with reference to server 300). Method 500 may include a series of messaging events (e.g., electronic communication, electronic message, and physical mailing) as described below.

At block 510, central server 110 may enable transmission of an electronic communication to a user having a user device at time $T_1$. The user device may be a client device 101. The electronic communication may include an electronic advertisement, a web page, or another electronic marketing document or communication (or a link to an electronic advertisement, a web page, or another electronic marketing document or communication). In some embodiments, the electronic communication may include a cookie, which may be a tracking cookie. In some embodiments, the electronic communication may be transmitted to the user device by central server 110. In some embodiments, central server may receive the electronic communication from messaging server 120 before sending the electronic communication to the user. In some embodiments, central server 110 may issue a request or instruction to messaging server 120 to transmit the electronic communication to the user device. Once transmitted, the electronic communication may be presented to the user via the user device (e.g., by displaying the electronic communication on a display on the user device).

At block 520, central server 110 may retrieve an electronic contact address for the user from database 130. The electronic contact address may be an e-mail address for receiving e-mail messages, a mobile device number for receiving text messages, or another address for a user to receive an electronic message.

At block 530, central server 110 may enable transmission of an electronic message to a user at time $T_2$. The electronic message may be an e-mail, a text message, or another electronic message. The electronic message may include an advertisement or marketing message (or a link to an advertisement or marketing message). In some embodiments, the electronic message may be transmitted to the user via the electronic contact address by central server 110. In some embodiments, central server may receive the electronic message from messaging server 120 before sending the electronic message to the user. In some embodiments, central server 110 may issue a request or instruction to messaging server 120 to transmit the electronic message to the user, and central server 110 may also send the user's electronic contact address to messaging server 120.

At block 540, central server 110 may retrieve a physical mailing address for the user from database 130. The physical mailing address may include a street address or post office box for the user, or another address for the user to receive a physical mailing.

At block 550, central server 110 may enable sending of a physical mailing to a user at time $T_3$. The physical mailing may include an advertisement or marketing message, and/or other physical materials used for marketing purposes. In some embodiments, the physical mailing may be sent to the user via the user's physical mailing address by central server 110. In some embodiments, central server may receive the physical mailing (or information about a selection of materials for the physical mailing) from messaging server 120 before sending the physical mailing to the user. In some embodiments, central server 110 may issue a request or instruction to messaging server 120 to send the physical mailing to the user, and central server 110 may also send the user's physical mailing address to messaging server 120.

At block 560, central server 110 may receive user information from the user via the user's device at time $T_4$. The user information may include the user's name, the user's e-mail address, the user's electronic contact address, and/or the user's mailing address. The user information may also include other information for identification of the user, such as, e.g., a user identifier. Any one or more of the messaging events may include a prompt for the user to respond. The user information may be sent by the user in response to one or more of the above-referenced messaging events. In some embodiments, the user information may be sent by the user while displaying or otherwise engaging with the electronic communication. Central server 110 may record the user information, information about the above-referenced messaging events and each of the times $T_1$, $T_2$, $T_3$, and $T_4$ at which the messaging events occurred, and may cause storage of the user information and information about the messaging events (including times) in database 130. Note that the times $T_1$, $T_2$, $T_3$, and $T_4$ are not necessarily consecutive, and may occur in any order; thus, for example, $T_3$ may occur before or after $T_1$ or $T_2$, $T_2$ may occur before or after $T_1$, etc.

In some embodiments, in sending user information via the user device, the user may engage with a product or service, or may request further engagement with (or information about) a product or service. In some embodiments, in sending user information via the user device, the user may request creation of an account using the user information. In some embodiments, the user may use other means (such as, e.g., via phone call and via in-person interaction at a business location) to request further information or creation of an account.

At block 570, central server 110 may transmit information about the user to cluster 140. The information transmitted to cluster 140 may include user information and information about the foregoing messaging events, including times $T_1$, $T_2$, $T_3$ and $T_4$.

At block 580, central server 110 may receive from cluster 140 assigned relative values for the messaging events, including the electronic communication, the electronic message, and the physical mailing.

At block 590, central server 110 may modify a strategy for engaging the user with advertising and marketing materials, based on the assigned relative values for the messaging events, including the electronic communication, the electronic message, and the physical mailing, as received from cluster 140. For example, the assigned relative values may be used to attribute fractional account sign-up value to the particular marketing channels at a person-level (e.g., a new customer may be 25% attributable to direct mail marketing, 50% attributable to email marketing, and 25% attributable to display ad marketing). This information may be used, along with revenue associated with that new customer's account(s), to determine a return on investment (ROI) for each marketing channel based on the relative cost to put out ads on the channel. Based on this, investment in lower ROI channels may be decreased and those funds may be shifted to higher ROI channels, thereby increasing overall marketing efficiency and potentially generating more revenue with the same amount of expenditure. If such analysis is performed on an essentially continuous basis, this asset re-allocation may also occur on an essentially continuous basis. Further, the ROI analysis may result in modifications to the order in which marketing channels are employed, such that, e.g., the more successful channels in leading to a sale may be prioritized.

Figure 6:
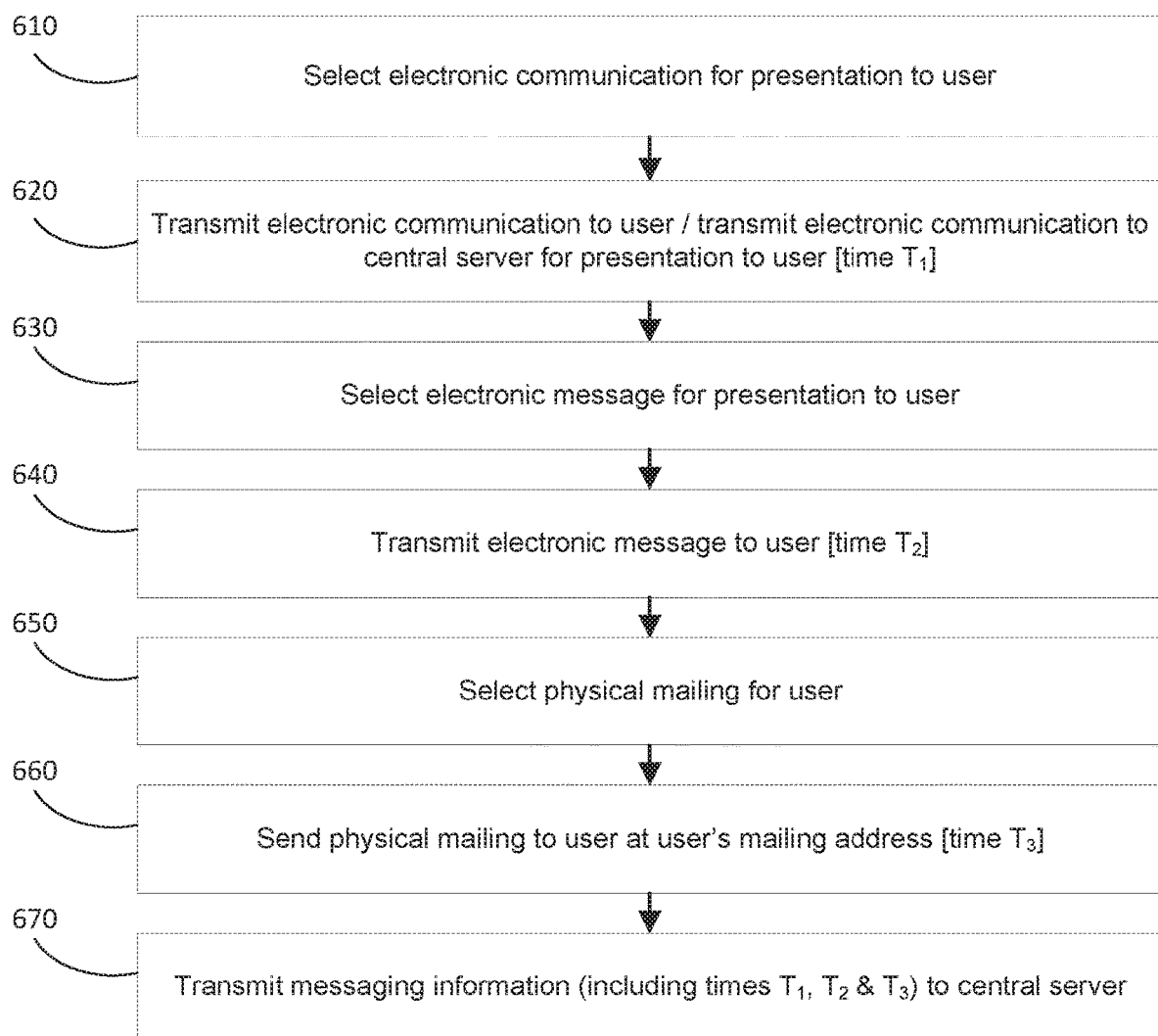
FIG. 6 is a flowchart illustrating a method of promoting user engagement according to one or more example embodiments.

FIG. 6 is a flowchart illustrating a method of promoting user engagement 600 according to one or more example embodiments, with reference to components and features described above including but not limited to the figures and associated description. Method 600 may be carried out by components of system 100, such as messaging server 120 (including, e.g., via application 301 executing in conjunction with processor 302 as described above with reference to server 300).

At block 610, messaging server 120 may select an electronic communication for presentation to a user having a user device. The user device may be a client device 101. The electronic communication may include an electronic advertisement, a web page, or another electronic marketing communication (or a link to an electronic advertisement, a web page, or another electronic marketing communication).

At block 620, messaging server 120 may transmit the selected electronic communication to the user at time $T_1$. In some embodiments, messaging server 120 may transmit the selected electronic communication to central server 110 for subsequent transmission to the user at time $T_1$. The transmission of the electronic communication to the user or to the central server 110 may be in response to a request or instruction from central server 110. The request or instruction from central server 110 may be accompanied by information about the user or the user's device.

At block 630, messaging server 120 may select an electronic message for presentation to the user. The electronic message may be an e-mail, a text message, or another electronic message. The electronic message may include an advertisement or marketing message (or a link to an advertisement or marketing message). In some embodiments, messaging server 120 may select an advertisement or marketing message (or a link to an advertisement or marketing message) for inclusion with a generic electronic message for presentation to the user.

At block 640, messaging server 120 may transmit the selected electronic message to the user via the user's electronic contact address at time $T_2$. In some embodiments, messaging server 120 may transmit the selected electronic message to central server 110 for subsequent transmission to the user at time $T_2$. The transmission of the electronic message to the user or to the central server 110 may be in response to a request or instruction from central server 110. The request or instruction from central server 110 may be accompanied by the user's electronic contact address, or messaging server 120 may retrieve the user's electronic contact address from database 130.

At block 650, messaging server 120 may select a physical mailing for mailing to the user. The physical mailing may include an advertisement or marketing message, and/or other physical materials used for marketing purposes.

At block 660, messaging server 120 may send the selected physical mailing to the user via the user's physical mailing address at time $T_3$. In some embodiments, messaging server 120 may send the selected physical mailing (or information about selected materials for the physical mailing) to central server 110 for subsequent mailing to the user at time $T_3$. The sending of the physical mailing to the user or to the central server 110 may be in response to a request or instruction from central server 110. The request or instruction from central server 110 may be accompanied by the user's physical mailing address, or messaging server 120 may retrieve the user's physical mailing address from database 130.

At block 670, messaging server 120 may transmit information about the foregoing messaging events, including times $T_1$, $T_2$ and $T_3$, to central server 110.

Figure 7:
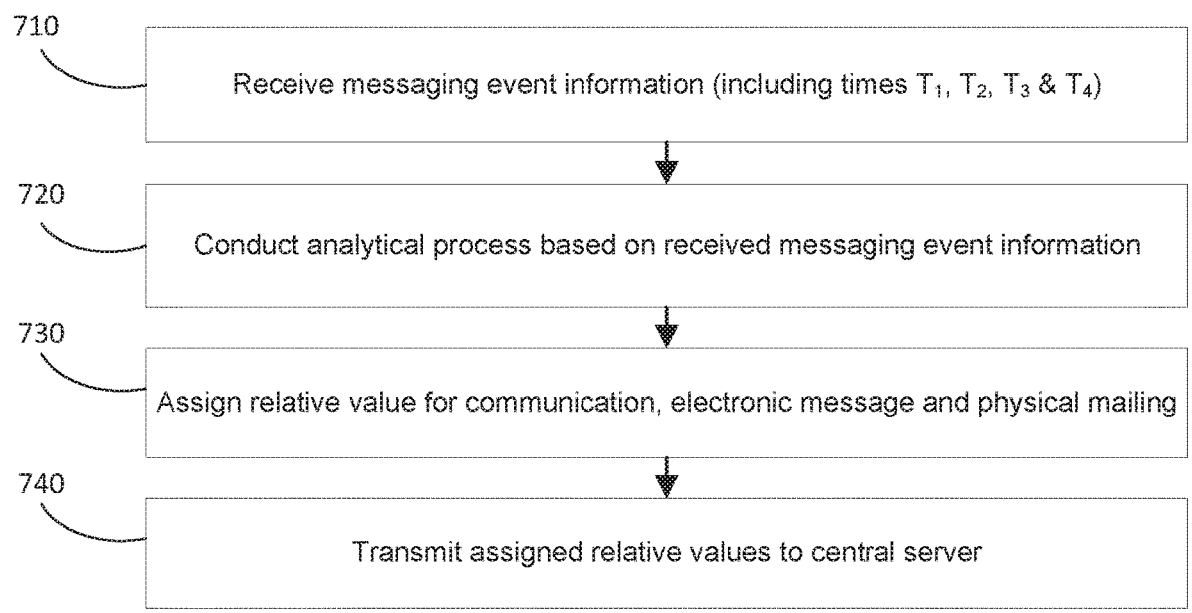
FIG. 7 is a flowchart illustrating a method of promoting user engagement according to one or more example embodiments.

FIG. 7 is a flowchart illustrating a method of promoting user engagement 700 according to one or more example embodiments, with reference to components and features described above including but not limited to the figures and associated description. Method 700 may be carried out by components of system 100, such as cluster 140 (including, e.g., via applications executing on server 410 and/or nodes 420 as described above with reference to cluster 400).

At block 710, cluster 140 may receive from central server 110 user information and information about messaging events, including times $T_1$, $T_2$, $T_3$ and $T_4$.

At block 720, cluster 140 may conduct an analytical process based on the received messaging event information. The analytical process may be based on a time decay analytical approach. The time decay analytical approach may be based on time decay attribution, in which exposure to marketing messages (or messaging events) closer in time to a positive user response receive greater attribution, while those messaging events more distant in time from a positive user response receive lesser attribution.

Figure 8A:
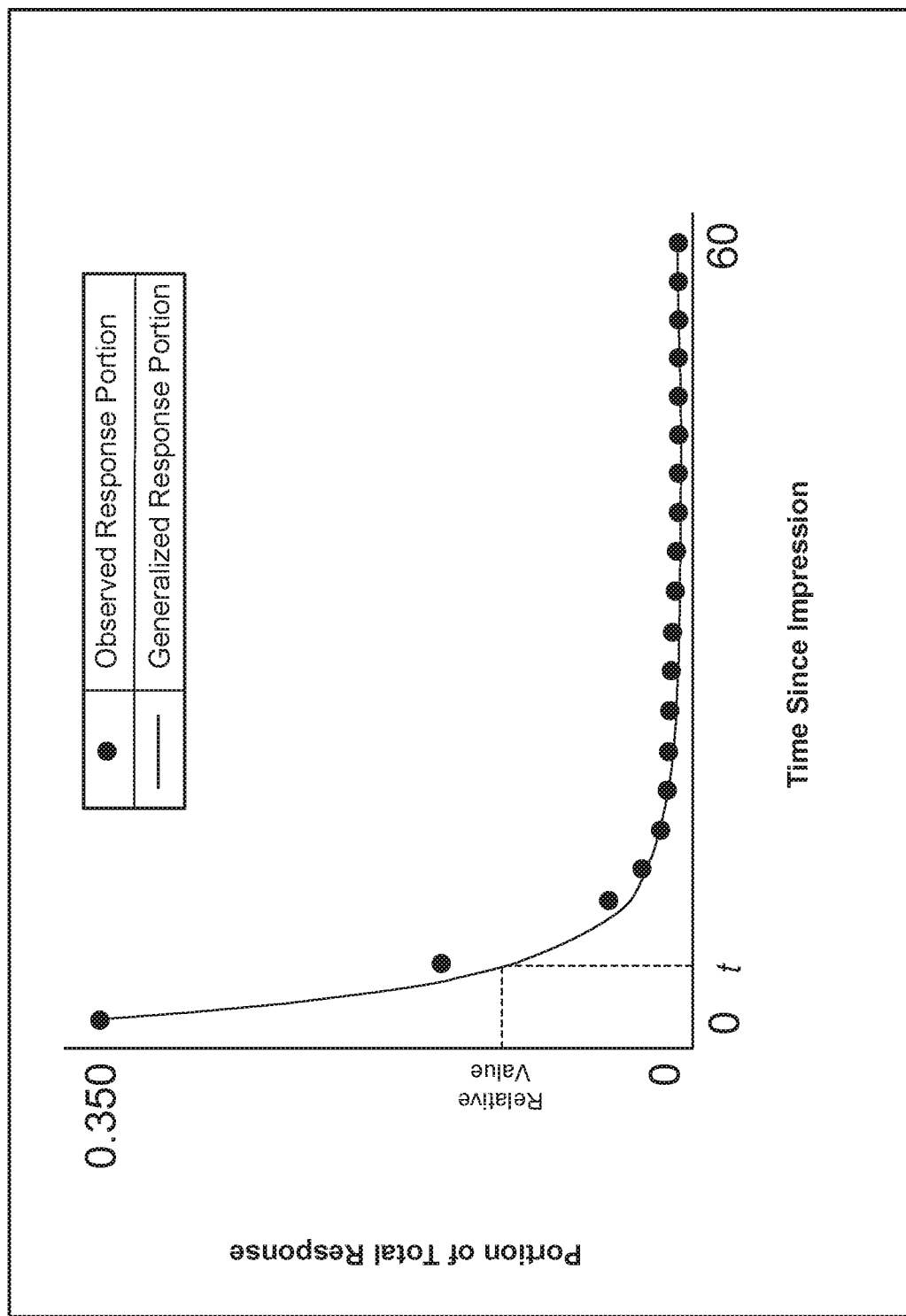
FIGS. 8A-8C show graphs illustrating a time to value relationship for advertising impressions and overall user response.

FIG. 8A shows a graph illustrating a generalized view of a time to value relationship for advertising impressions and overall user response, according to a theoretical approach. The graph contains data points representing the respective portions of overall responses expected from users (Y-axis) and the time period between the time at which a particular advertising impression is made and the time at which a positive user response is expected to be received (X-axis). The graph in FIG. 8A also shows a curve which represents a fit between the data points. As shown in the graph, the greatest portion of user responses occurs very shortly after the advertising impression (user exposure to an ad) is made, and the portion of user responses tails off as the amount of time between advertising impression and response increases, eventually leading toward zero response. This illustrates time decay attribution, in which the advertising impressions closest in time to the user response receive the greatest level of attribution, and advertising impressions farther way in time from the user response receive less attribution.

Figure 8B:
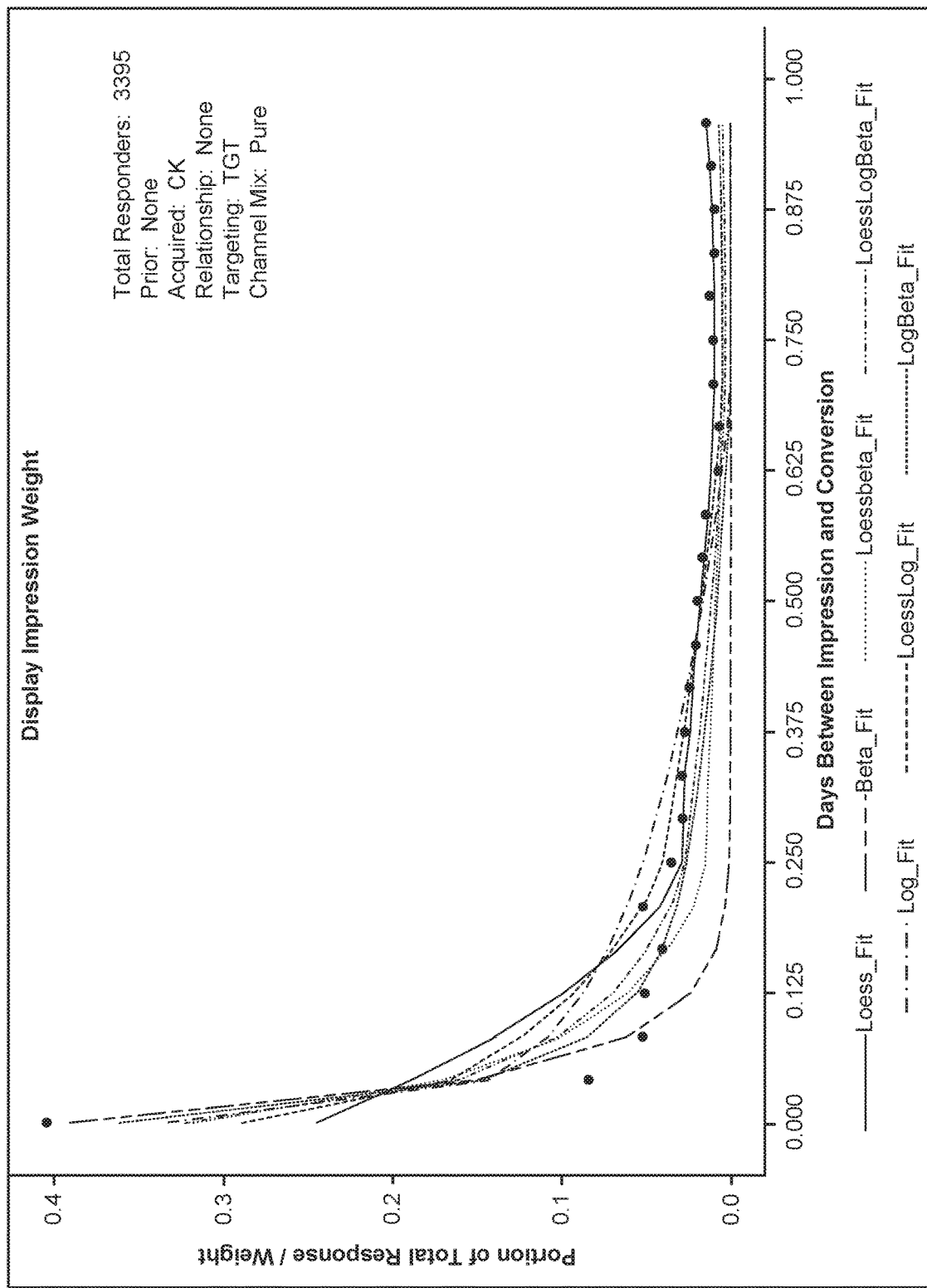

FIG. 8B shows a graph illustrating a time to value relationship for advertising impressions and overall user response, based on a set of user response data to advertising impressions. Similar to FIG. 8A, the graph in FIG. 8B contains data points representing the respective portions of overall responses from users (Y-axis) and the time period between the time at which a particular advertising impression is made and the time at which a positive user response is received (X-axis). The Y-axis ranges from 0 to 0.4 (representing a 40% portion of total response), and the X-axis ranges from 0 to 1.0 days. Like FIG. 8A, the graph in FIG. 8B shows that the greatest portion of user responses occurs very shortly after the advertising impression (user exposure to an ad) is made, and the portion of user responses tails off as the amount of time between advertising impression and response increases, eventually leading toward zero response. The graph in FIG. 8B also shows a set of curves which represents a variety of fits between the data points.

Figure 8C:
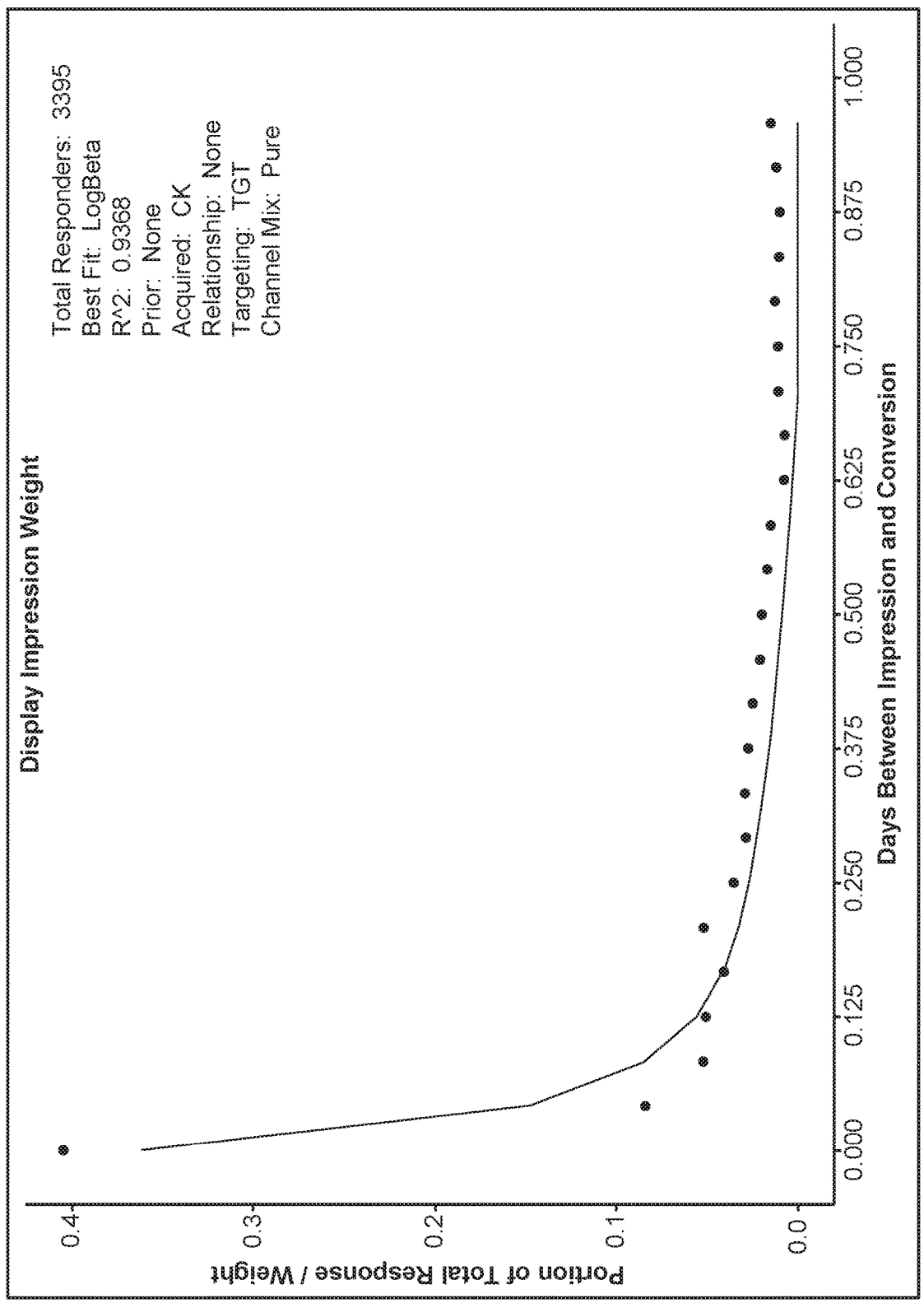

FIG. 8C shows a graph illustrating a time to value relationship for advertising impressions and overall user response, based on the same data set of user response to advertising impressions as shown in FIG. 8B, and using the same X-axis (ranging from 0 to 1.0 days) and Y-axis (ranging from 0 to 0.4—representing a 40% portion of total response) as in FIG. 8B. The graph in FIG. 8C also shows the curve, based on the set of curves in FIG. 8B, which represents the best fit between the data points. The best fit, as shown in FIG. 8C, is a "log-beta" fit, which is the combination of a best fit logarithmic distribution and a best fit beta distribution over the time range on the x-axis. The combination is the average of the values of these two fits at each time increment. The solid line depicted in FIG. 8C represents a generalization of the actual data (given by the dots) into a relationship that can be applied to new data to value a marketing message based on time from conversion. The result of this best-fitting is an estimated relationship between the relative timing of a marketing message (i.e., ad) (X-axis, with the point of conversion/sale as 0) and the relative value of that ad equivalent to the generalized proportion of responders observed at each time period (Y-axis). This value is a 0 to 1 number that is unique to each segment of responder analyzed (e.g., people who respond to an offer having last seen an ad in a particular marketing channel, such as an email). It will be understood that the curves of FIG. 8B and FIG. 8C may be different for different segments, which may allow for value variation across segments (and a more nuanced understanding of impacts of different channels on different types of customers). It will be further understood that the data points and curves in FIG. 8B and FIG. 8C may be extrapolated or extended to periods covering a multiple of days, such as 10 days, 30 days, 60 days, etc.

Returning to FIG. 7, block 720, cluster 140 may determine the respective periods of time elapsing between the time of the user response ($T_4$) and the times at which each of the messaging events occurred ($T_1$, $T_2$ and $T_3$), namely:

$$P_A = T_4 - T_1 \quad (1)$$

$$P_B = T_4 - T_2 \quad (2)$$

$$P_C = T_4 - T_3 \quad (3)$$

According to equation (1), $P_A$ is the time period elapsed between the user response and the time at which the electronic communication was sent to the user. According to equation (2), $P_B$ is the time period elapsed between the user response and the time at which the electronic message was sent to the user. According to equation (3), $P_C$ is the time period elapsed between the user response and the time at which the physical mailing was sent to the user. As explained above with reference to FIG. 8C, the best-fit curve provides an estimated relationship between the relative timing of a marketing message (i.e., ad) and the relative value of that ad equivalent to the generalized proportion of responders observed at each time period. For a given person's P times ($P_A$, $P_B$ and $P_C$ as defined above), the time may be matched to the relative value given that person's segment for each ad's P from the curve. The result is a set of 0 to 1 values for each marketing message (i.e., ad) for each person. For that person, all ad values for a given channel may be summed, and the total may be divided by the sum of all values to get the proportion of credit each channel deserves for the sale to that person. This proportional credit is the attribution for that customer, and all such values for a customer sum to 1.

At block 730, cluster 140 may assign relative values for the messaging events, including the electronic communication, the electronic message, and the physical mailing, based on the analytical process of block 720.

The values of $P_A$, $P_B$, $P_C$, and their maximum or minimum value, may have significance as follows. If the maximum elapsed time, max $\{P_A, P_B, P_C\}$ (that is, the longest lapse in time from any of the marketing events to a response) is less than or equal to 24 hours, then channels with hour-level granularity (e.g., display of an electronic message) may be assigned a value equal to the timing of the exposure; channels with day-level granularity may be credited for the nearest time value to conversion (i.e., the time=0 value for that channel). If the minimum time, min $\{P_A, P_B, P_C\}$, exceeds the window for the channel (e.g., 30 days for e-mail, 60 days for physical mailing), then the customer sale may be considered unattributable because it may be deemed unlikely that a marketing message viewed that far in the past was influential in the ultimate sale to that customer.

At block 740, cluster 140 may transmit the assigned relative values for the messaging events, including assigned relative values for the electronic communication, the electronic message, and the physical mailing. In some embodiments, the relative value may be all that is required, assuming the information used for retrieval (e.g., the customers' segment and the channels in which the customers saw ads) remains associated with the value.

In some embodiments, the relative values may not be used to refine the methods described herein, due to the potentially lacking capability of judging the error for attribution. Instead, the algorithm, in the form of weights, may improve over time with the additional of data to refine the time-to-value relationship.

In some embodiments, some or all of the procedures and analysis described above with reference to cluster 140 may be performed instead by central server 110 or by a back-end processor in data communication with central server 110.

The description of embodiments in this disclosure provides non-limiting representative examples referencing figures and numerals to particularly describe features and teachings of different aspects of the disclosure. The embodiments described should be recognized as capable of implementation separately, or in combination, with other embodiments from the description of the embodiments. A person of ordinary skill in the art reviewing the description of embodiments should be able to learn and understand the different described aspects of the disclosure. The description of embodiments should facilitate understanding of the disclosure to such an extent that other implementations, not specifically covered but within the knowledge of a person of skill in the art having read the description of embodiments, would be understood to be consistent with an application of the disclosure Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for promoting user engagement comprising:
a communication interface configured to provide, to a user device via a network, a user interface that displays a communication at a first time;
a messaging server configured to send an electronic message to a user wherein the electronic message is sent at a second time;
a database containing a name and mailing address associated with the user, wherein a physical mailing is sent to the user's mailing address at a third time; and
a central server communicatively connected to the user device, the central server configured to record user information received from the user device at a fourth time, wherein the central server is in data communication with the messaging server and database and configured to transmit the first, second, third, and fourth times to a cluster configured to analyze the first, second, third, and fourth times to determine a relative value of the communication, electronic message, and physical mailing.

2. The system of claim 1, wherein the user information comprises the user's name, email address, and mailing address.

3. The system of claim 1, wherein the user causes the user device to transmit the user information to engage with a product.

4. The system of claim 1, wherein the user causes the user device to transmit the user information to create an account.

5. The system of claim 1, wherein the fourth time and the earliest one of the first time, second time and third time are within at least one selected from the group of 24 hours of each other, 30 days of each other, and 60 days of each other.

6. The system of claim 1, wherein the cluster comprises at least one server and at least one node.

7. The system of claim 6, wherein the cluster comprises a plurality of nodes configured to perform a task in a coordinated manner under the direction of the central server.

8. The system of claim 7, wherein direction of the central server comprises coordination, by the central server, of the performance of the task by each of the plurality of nodes.

9. The system of claim 7, wherein direction of the server comprises scheduling, by the central server, of the performance of the task by each of the plurality of nodes.

10. The system of claim 1, wherein:
the communication comprises a tracking cookie, and
the electronic message comprises at least one selected from the group of an email and a text message.

11. The system of claim 1, wherein the relative value is based on the time between the first, second, or third time and the fourth time.

12. The system of claim 1, wherein the user device transmits user device information to the central server when the user engages with the communication.

13. A method of promoting user engagement comprising:
transmitting a communication via a network from a server to a user interface displayed on a user device at a first time;
transmitting an electronic message via a network from a messaging server to a user at a second time;

retrieving a user's mailing address from a database and enabling a physical mailing to be sent to a user's mailing address at a third time;

recording a fourth time at which the user transmits user information from the user device to the server;

determining the time elapsed from the first, second, and third time to the fourth time;

assigning a relative value to the communication, electronic message, and physical mailing.

14. The method of claim 13, further comprising modifying a user engagement strategy based on the assigned values.

15. The method of claim 13, wherein the server is in data communication with the messaging server, user device, and database, and the server records the user information in a database.

16. The method of claim 13, wherein the communication is configured to transmit user device information to the server when the user interacts with the communication, and wherein the server is configured to record user device information.

17. The method of claim 13, wherein the server creates an account based on the user information received from the user device.

18. The method of claim 13, wherein a distributed cluster is used to assign a relative value to the communication, electronic message, and physical mailing.

19. The method of claim 18, wherein the relative value attributes fractional probabilities of a user action in response to the communication, electronic message, and physical mailing.

20. A distributed system for creating user accounts comprising:

a central server in data communication with a user device displaying a user interface, a database containing user information, and a messaging server in data communication with the central server, database and user device;

wherein the messaging server is configured to transmit a communication to the user device at a first time and wherein the communication is displayed on the user interface;

wherein the messaging server sends an electronic message to a user based on user information stored in the database at a second time;

wherein the user information recorded in the database is used to send a physical mailing to the user's mailing address at a third time;

wherein the central server is configured to receive user information from the user device when the user creates an account at a fourth time; and wherein the time elapsed between the first, second, or third time and the fourth time is used to establish a relative value of the communication, electronic message, and physical mailing.

* * * * *